(12) United States Patent
Yanagihara et al.

(10) Patent No.: US 11,977,315 B2
(45) Date of Patent: May 7, 2024

(54) OPTICAL MODULE

(71) Applicant: Nippon Telegraph and Telephone Corporation, Tokyo (JP)

(72) Inventors: Ai Yanagihara, Musashino (JP); Kenya Suzuki, Musashino (JP); Takashi Go, Musashino (JP); Keita Yamaguchi, Musashino (JP); Yuko Kawajiri, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 415 days.

(21) Appl. No.: 17/297,817

(22) PCT Filed: Dec. 11, 2019

(86) PCT No.: PCT/JP2019/048463
§ 371 (c)(1),
(2) Date: May 27, 2021

(87) PCT Pub. No.: WO2020/129771
PCT Pub. Date: Jun. 25, 2020

(65) Prior Publication Data
US 2021/0397065 A1 Dec. 23, 2021

(30) Foreign Application Priority Data

Dec. 20, 2018 (JP) ................................. 2018-238683

(51) Int. Cl.
*G02F 1/313* (2006.01)
*G02B 6/12* (2006.01)
(Continued)

(52) U.S. Cl.
CPC ........... *G02F 1/3136* (2013.01); *H01R 12/71* (2013.01); *H01R 13/24* (2013.01); *G02F 2201/12* (2013.01)

(58) Field of Classification Search
CPC .... G02F 1/3136; G02F 1/313; G02F 2201/12; H01R 12/71; H01R 13/24; G02B 6/12
See application file for complete search history.

(56) References Cited

U.S. PATENT DOCUMENTS 5,160,270 A * 11/1992 Reymond ............ H01R 12/712
439/70
11,107,799 B1 * 8/2021 Alapati ................. H01L 23/481
(Continued)

FOREIGN PATENT DOCUMENTS

JP 2010-540941 A 12/2010
JP 2016-148753 A 8/2016
(Continued)

OTHER PUBLICATIONS

Ken Tanizawa et al., *Ultra-Compact 32 X 32 Strictly-Non-Blocking Si-Wire Optical Switch with Fan-Out LGA Interposer*, Optical Express, vol. 23, No. 13, 2015, pp. 17599-17606.
(Continued)

*Primary Examiner* — Ryan A Lepisto
*Assistant Examiner* — Erin D Chiem
(74) *Attorney, Agent, or Firm* — Workman Nydegger

(57) ABSTRACT

The positions at which electrode pads are arranged can be made more flexible, and electrical interconnects to be installed can be reduced. In addition, the degree of integration of a chip increases, making it possible to realize a large-scale device (optical switch etc.). In an optical module of the present invention, an interposer (an electrical connection intermediary component with electrode pins attached onto upper and lower faces in an array) is laid over a chip
(Continued)

that includes a device configured by using a planar lightwave circuit (PLC) fixed onto a fixing metal plate, and a control substrate for driving the device is laid over the interposer. These components are mechanically fixed by a fixing screw or the like, and the electrode pads of the chip and the control substrate are connected to each other via the interposer.

6 Claims, 7 Drawing Sheets

(51) Int. Cl.
*H01R 12/71* (2011.01)
*H01R 13/24* (2006.01)

(56) References Cited

U.S. PATENT DOCUMENTS

| | | | |
|---|---|---|---|
| 2009/0079452 A1 | 3/2009 | Eldridge et al. | |
| 2010/0148356 A1 | 6/2010 | Tamaki | |
| 2014/0023333 A1* | 1/2014 | Ishii | G02B 6/12 |
| | | | 385/129 |
| 2016/0299361 A1 | 10/2016 | Cheung et al. | |
| 2019/0113778 A1 | 4/2019 | Miyazaki et al. | |
| 2021/0166991 A1* | 6/2021 | Liu | H01L 23/473 |

FOREIGN PATENT DOCUMENTS

| | | |
|---|---|---|
| JP | 2017-187521 A | 10/2017 |
| WO | 2010/050087 A1 | 5/2010 |

OTHER PUBLICATIONS

T. Shibata et al., *Silica-Based Waveguide-Type 16 X 16 Optical Switch Module Incorporating Driving Circuits*, IEEE Photonics Technology Letters, vol. 15, No. 9, 2003, pp. 1300-1302.

Toshio Watanabe et al., *Compact PLC-Based Transponder Aggregator for Colorless and Directionless ROADM*, OFC/NFOEC2011, Paper OTuD3, Mar. 6, 2011, pp. 1-3.

Dimitrios Apostolopoulos et al., *Photonic Integration Enabling New Multiplexing Concepts in Optical Board-To-Board and Rack-To-Rack Interconnects*, Proc. SPIE 8991, Optical Interconnects XIV, 89910D, Mar. 8, 2014, pp. 1-15.

Yan Yang et al., *3D Silicon Photonics Packaging Based on TSV Interposer for High Density On-Board Optics Module*, 2016 IEEE 66th Electronic Components and Technology Conference (ECTC), May 31, 2016, pp. 483-489.

* cited by examiner

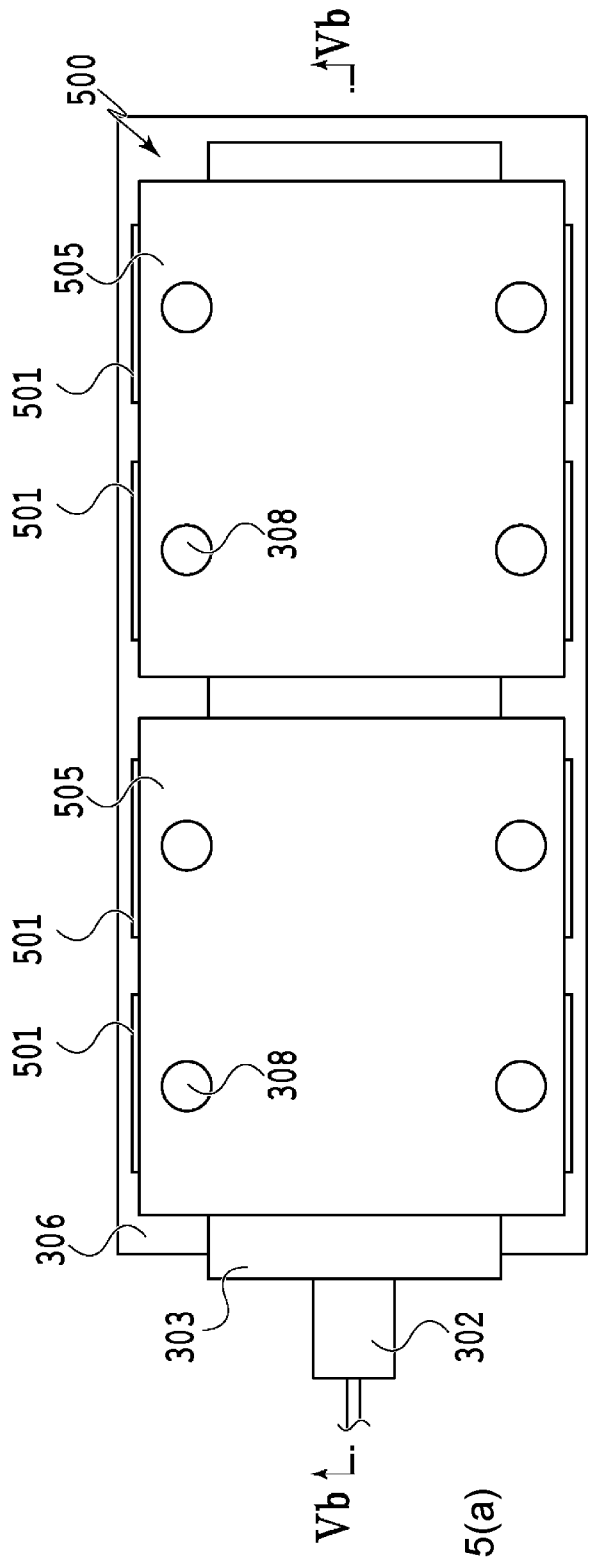
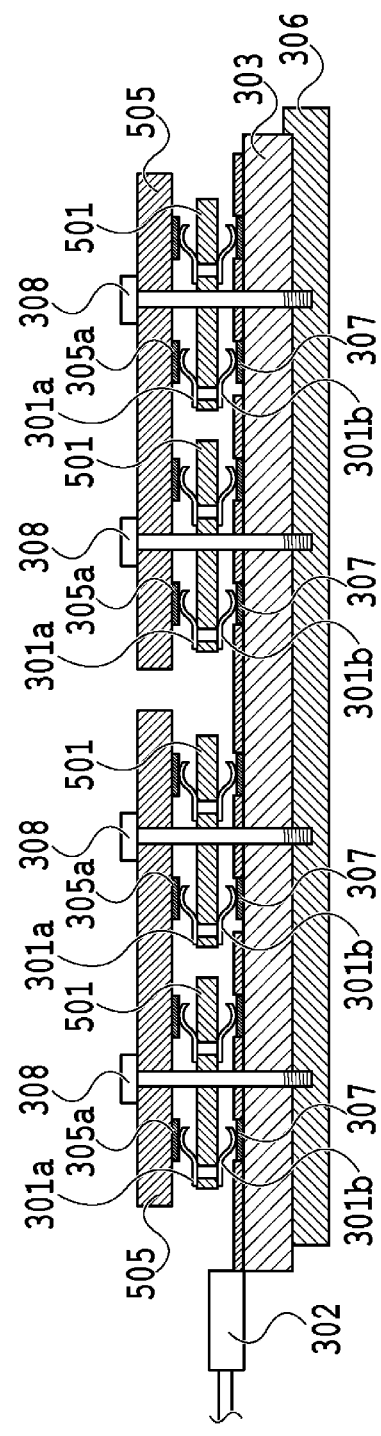
Fig. 5(a)
Fig. 5(b)

OPTICAL MODULE

TECHNICAL FIELD

The present invention relates to an optical module that includes a planar lightwave-type optical device for use in optical communication.

BACKGROUND ART

Large-scale matrix optical switches have been attracting attention for expansion of optical communication networks and improvement of the flexibility thereof (NPL 1).

Quartz-based PLCs (Planar Lightwave Circuits) have excellent optical properties such as low propagation loss, and array integration thereof is easy. Thus, such PLCs are suitable for realization of large-scale switches.

An optical switch that uses a quartz-based PLC constitutes a matrix switch by arranging a plurality of switch elements in an array, each one of the switch elements being a Mach-Zehnder interferometer that utilizes the thermo-optic effect (NPLs 2 and 3).

Here, a configuration of a conventional PLC optical switch module will be described. FIG. 1 shows a configuration of a conventional PLC optical switch, and FIG. 2 shows an electrical interconnect layout of the PLC.

In the conventional PLC optical switch module 100, Mach-Zehnder interferometers 104 are arranged in an array on a PLC chip 103 that is connected to an optical fiber 102. In the PLC optical switch module 100, electric power needs to be supplied to heaters for driving the respective Mach-Zehnder interferometers 104. For this reason, the PLC chip 103 and a control substrate 105 for driving the PLC chip 103 are fixed onto a fixing plate 106, and electrode pads 107a and 107b on the PLC chip 103 and the control substrate 105, respectively, are connected to each other by means of bonding using wires 101. The electrode pads 107a are arranged near one side of the PLC chip 103 in order to bond the PLC chip 103 and the control substrate 105 to each other using the wires 101. For this reason, the electrical interconnects need to be routed from the heaters for the switches to the electrode pads 107 installed at a chip end. A broken line 108 indicates a state of routing the electrical interconnects within a surface of the PLC chip 103.

CITATION LIST

Non Patent Literature

[NPL 1] K. Tanizawa, et. al., Opt. Exp., 2015, Vol. 23, No. 13, pp. 17599-17606

[NPL 2] T. Shibata, M. Okuno, T. Goh, T. Watanabe, M. Yasu, M. Itoh, M. Ishii, Y. Hibino, A. Sugita, and A. Himeno "Silica-based waveguide-type 16×16 optical switch module incorporating driving circuits" IEEE PHOTONICS TECHNOLOGY LETTERS, SEPTEMBER 2003, VOL. 15, NO. 9

[NPL 3] T. Watanabe, K. Suzuki, T. Goh, K. Hattori, A. Mori, T. Takahashi, T. Sakamoto, K. Morita, S. Sohma, and S. Kamei: "Compact PLC-based transponder aggregator for colorless and directionless ROADM," 2011, OFC/NFOEC2011, Paper OTuD3.

SUMMARY OF THE INVENTION

Technical Problem

In the conventional PLC optical switch module, as the number of switches integrated in the chip increases with an increase in the scale of the switch, the area occupied by the routed electrical interconnects significantly increases.

Also, in the conventional PLC optical switch module, the distances of electrical interconnects that connect phase shifters and the electrode pads differ depending on the positions at which the phase shifters are arranged, and thus interconnect resistance values differ between the phase shifters. For this reason, the driving voltage differs between the phase shifters, and different driving voltages are separately applied thereto.

The main problem in realizing a large-scale optical switch lies in a reduction in the electrical interconnect region accommodated in the chip surface.

As mentioned above, as the number of integrated switches increases, the area occupied by the routed electrical interconnects accommodated in the chip surface becomes significant, and these electrical interconnects are rate-limiting factors for high-density integration of switch elements.

Moreover, the larger the chip size is due to the electrical interconnects, the fewer the number of large-scale optical switches is that can be produced from a single wafer, so mass productivity is also degraded. In addition, the chip cost increases.

Accordingly, to realize an increase in the scale of a switch, it is necessary to reduce the electrical interconnect region accommodated in the chip surface and highly densely integrate the switches.

Also, to improve mass productivity of large-scale optical switches, it is necessary to reduce the area occupied by the electrical interconnects to reduce the chip size.

Means for Solving the Problem

The present invention proposes a three-dimensional mounting method in which electrical interconnects, which have been accommodated in a chip surface thus far, is taken out of the chip and connected to a control board.

An electrical connection intermediary component with electrode pins arranged in a pinholder pattern on the two faces of a PLC optical switch module is electrically connected by sandwiching the electrical connection intermediary component between a PLC chip and a control board.

An aspect of an optical switch of the present invention includes: a planar lightwave circuit having an electrode pad on an upper face; a control substrate for driving the planar lightwave circuit, the control substrate being arranged above the upper face of the planar lightwave circuit and having an electric pad on a lower face opposing the upper face of the planar lightwave circuit; and an electrical intermediary component arranged between the upper face of the planar lightwave circuit and the lower face of the control substrate, wherein the electrode pad of the planar lightwave circuit and the electrode pad of the control substrate are connected to each other via the electrical intermediary component.

Effects of the Invention

According to the present invention, the positions at which the electrode pads are arranged are more flexible, and the electrode interconnect to be routed can be reduced. Thus, the degree of integration of switches increases, and a large-scale optical switch can be realized. In addition, the chip size decreases, and the cost can be reduced.

Advantages of reducing the electrical interconnect region and reducing the chip size are as follows.

The first advantage is that a large-scale optical switch can be realized.

The second advantage is that the chip size can be reduced. Thus, the number of chips that can be produced from one wafer increases, reducing the chip cost and increasing the mass productivity.

The third advantage is that the lengths of the electrical interconnects connected to the switches can be made uniform, and thus a variation in the interconnect resistance values can be reduced.

When electrical connection is made in the vertical direction, the electrical interconnect length decreases, and the electrode pads can be more flexibly arranged. Thus, the lengths of the interconnects can be made uniform.

Since, as a result, the resistance values thus becomes almost equal when driving the phase shifters, and all phase shifters can be driven with a constant voltage, switch control is simplified, enabling simplification and downsizing of the power supply control board.

BRIEF DESCRIPTION OF DRAWINGS

FIG. 5(a) is a top view showing a quartz PLC optical switch bare module that has an electrical mounting method of Embodiment 2.

FIG. 5(b) is a cross-sectional view showing the quartz PLC optical switch bare module that has the electrical mounting method of Embodiment 2.

DESCRIPTION OF EMBODIMENTS

Hereinafter, an optical device according to embodiments of the present invention will be described.

Embodiment 1

Embodiment 1 will describe a 16×16 multicast switch that realizes a planar electrical connection structure using a commercially available interposer (an electrical connection intermediary component with electrode pins attached on the upper and lower faces in an array).

In this embodiment, an interposer with a lead pin portion of the spring type is used in order to address warping of the chip of the planar lightwave circuit.

Figure 3A:
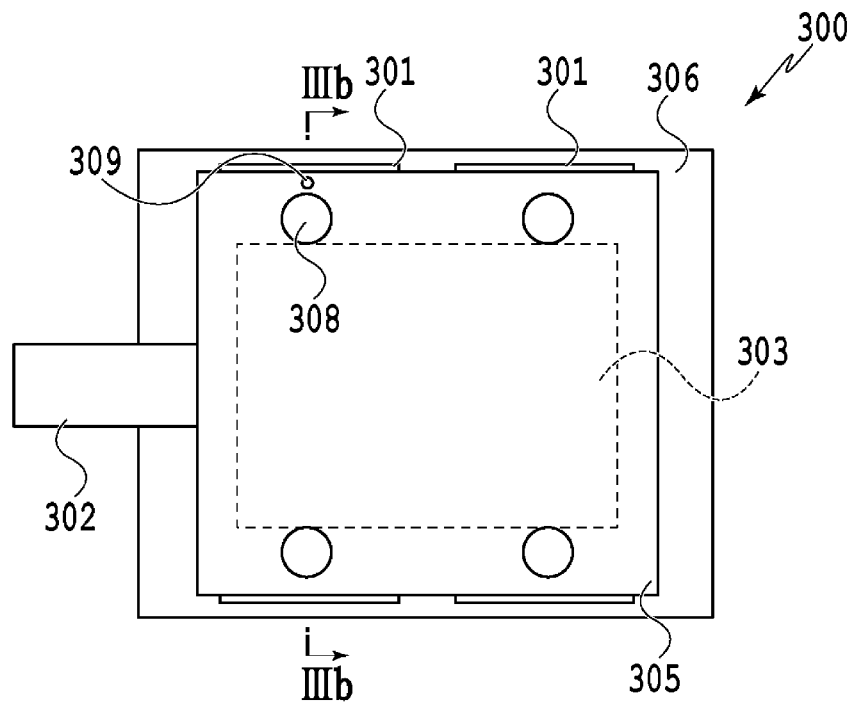
FIG. 3(a) is a top view showing a quartz PLC optical switch bare module that has an electrical mounting method of Embodiment 1.
Figure 3B:
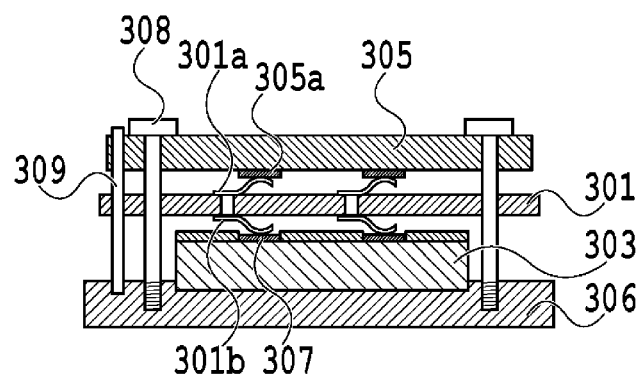
FIG. 3(b) is a cross-sectional view showing the quartz PLC optical switch bare module that has the electrical mounting method of Embodiment 1.

FIGS. 3(a) and 3(b) show a top view and a cross-sectional view, respectively, of a multicast switch module 300. The multicast switch module 300 includes a quartz-based planar lightwave circuit (PLC, planar lightwave circuit chip) 303 that is connected to an optical fiber 302 and constitutes an optical circuit, a control substrate 305 that drives and controls the optical circuit, and an interposer (interposer components) 301 that connects the PLC 303 and the control substrate 305 to each other. The multicast switch module 300 also includes a fixing plate 306 and screws 308 for fixing the PLC 303, the control substrate 305, and the interposer 301. Note that the control substrate may be an insulating substrate formed by impregnating glass fiber with epoxy resin.

Figure 4:
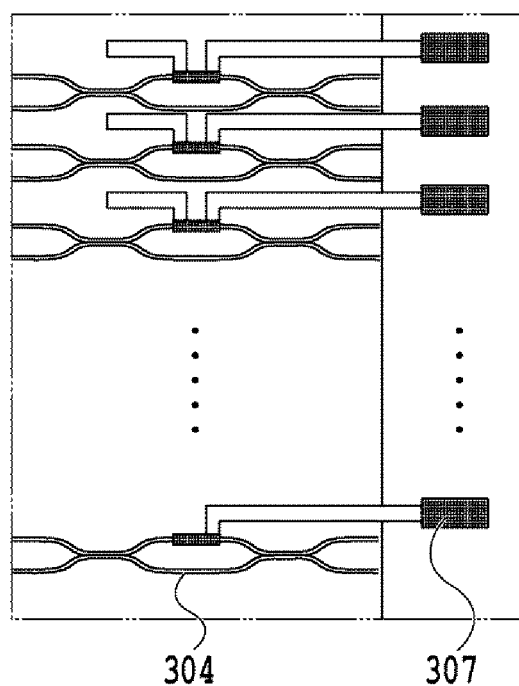
FIG. 4 is a diagram showing a layout of PLC electrical interconnects of Embodiment 2.

FIG. 4 shows a schematic view of a layout an optical circuit and electrical interconnects of the PLC. The PLC includes 256 optical switches, each of which includes a Mach-Zehnder interferometer 304. An electrode pad 307 is arranged near each of the arranged optical switches, and a heater in the Mach-Zehnder interferometer 304 and the electrode pad 307 are connected by an electrical interconnect. The electrode pad 307 may include Au, for example.

Figure 2:
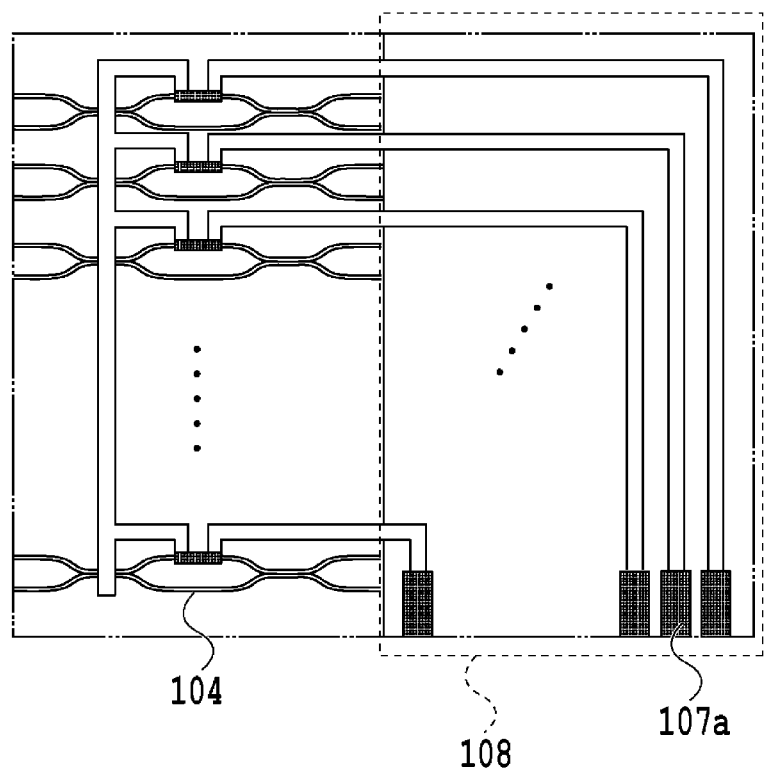
FIG. 2 is a diagram showing an electrical interconnect layout of a conventional PLC.

As is understood by comparing the conventional electrical interconnect layout shown in FIG. 2 with the electrical interconnect layout in this embodiment in FIG. 4, the electrical interconnect length in this embodiment is greatly smaller than that in the conventional example, and the electrical interconnect length in this embodiment is equal for all of the switches. Accordingly, the electrical interconnects in the PLC chip surface can be reduced.

This PLC optical switch can be produced using a common method, such as those described in NPL 1 to 3.

An optical fiber 302 with a total of 32 cores for input and output is connected to an input-output portion of a PLC end face. The quartz-based planar lightwave circuit (PLC) 303, which is fixed onto the fixing plate 306 with an adhesive, and the control substrate 305 for driving the PLC are fixed to each other with the screws via the interposer 301.

At this time, the positions at which the interposer 301, the PLC 302, and the control substrate 305 for driving the PLC are fixed are aligned using pins. These pins are guide pins 309, and the pins may be or need not be provided with screws. The positioning can be done due to the guide pins 309 passing through holes in the interposer 301 and holes in the control substrate 305 and being fitted to recessed portions of the fixing plate 306. Note that the guide pins 309 may be provided at any positions at which the guide pins 309 do not pass through the PLC 303, passes through the holes in the interposer 301 and the holes in the control substrate 305, and is fitted to the recessed portion of the fixing plate 306.

The control substrate 305 for driving the PLC is covered from above by a CrCu plate (not shown) in which screw holes are formed, and a base plate, e.g. the fixing plate 306 that contains CuCr, and the CuCr plate, which is the uppermost face, are screwed with each other. By thus screwing, lead pins (hinge electrodes) 301a of the interposer of the spring type are pressed against the PLC 303 and the electrode pads 305a of the control substrate 305 for driving the PLC, and are brought into contact therewith and fixed thereto.

The configuration of the module in the top view and the cross-sectional view is as shown in FIGS. 3(a) and 3(b). The PLC 303 is fixed onto the fixing plate 306. The interposer 301 and the control substrate 305 for driving the PLC are stacked on the PLC 303, and the PLC 303, the interposer 301, and the control substrate 305 for driving the PLC are mechanically fixed. The fixing plate 306 and the PLC 303 are fixed using an adhesive. By providing (making) holes in the fixing plate 306, the interposer 301, and the control substrate 305 for driving the PLC, the fixing plate 306 that contains metal, the interposer 301, and the control substrate 305 for driving the PLC are fixed with the screws 308 through the holes. At this time, a metal plate (not shown) may be inserted onto the control substrate 305 for driving the PLC such that the pressure of the screws 308 are uniformly applied to the entire face of the control substrate 305 for driving the PLC. The pad electrodes 307 of the PLC 303, the lead pins (hinge electrodes) 301b of the interposer, and the electrode pads 307 of the control substrate 305 for driving the PLC need to be positioned, and the positioning is performed using the guide pins 309 in addition to the aforementioned screws 308 for fixation. The lead pins 301b of the interposer are of the spring type.

By the above steps, a multicast switch module 300 was produced that includes: a planar lightwave circuit PLC 303 that has electrode pads on an upper face; a control substrate 305 for driving the planar lightwave circuit that is arranged above the upper face of the planar lightwave circuit and have electrode pads on a lower face opposing the upper face of the planar lightwave circuit; and an electrical intermediary member arranged between the upper face of the planar lightwave circuit and the lower face of the control substrate 305, e.g. an interposer 301, wherein the electrode pads of the planar lightwave circuit 303 and the electrode pads of the control substrate 305 are connected to each other via the electrical intermediary members.

Electrical characteristics and optical properties of the thus-produced 16×16 multicast switch module was evaluated.

Figure 1:
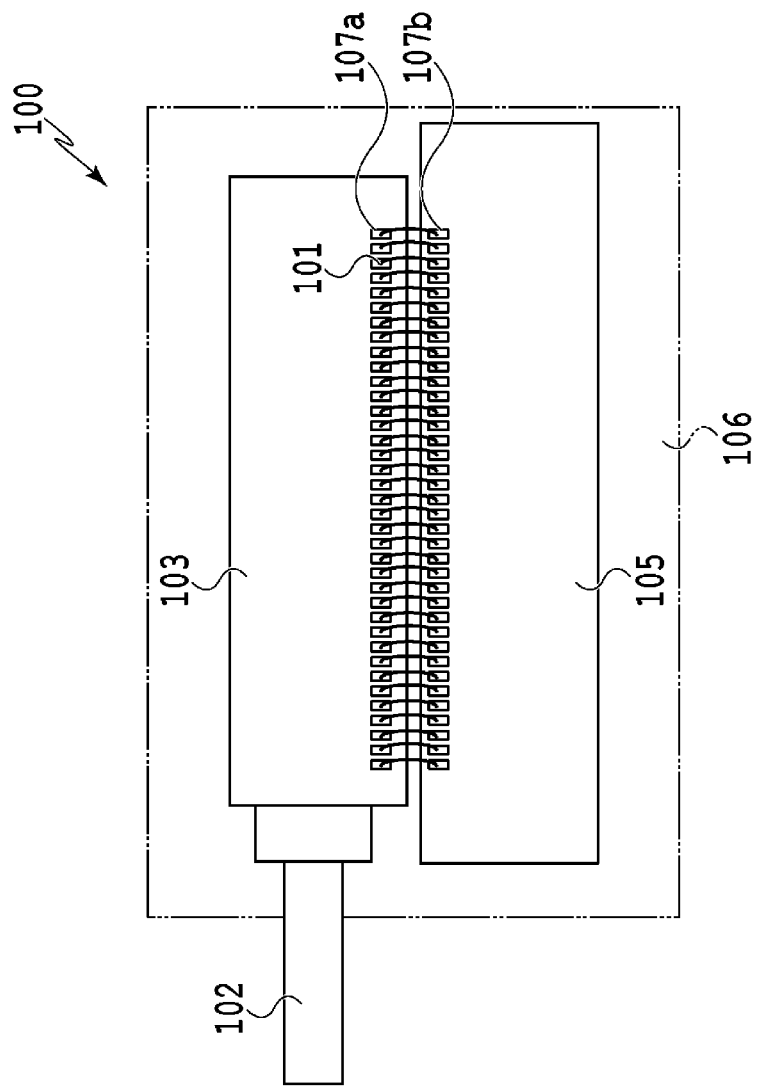
FIG. 1 is a top view showing a conventional quartz PLC optical switch bare module.

It was discovered that all terminals were conductive, and the variation in resistance values was ±0.1Ω. Thus, uniform contact was confirmed at all terminals. This variation in the resistance values is smaller than the variation in the case of wire bonding connection of the conventional optical switch (FIGS. 1 and 2). The main reason for this result is considered to be a smaller variation in the interconnect length on the chip in this embodiment than that in the case of the wire bonding method.

Next, optical properties of the optical switch were evaluated. The transmission loss, extinction ratio, and so on were obtained that are equal to those of an optical module that employs the conventional wire bonding method. This made it possible to realize a 16×16 MCS that uses an interposer in the electrical mounting method. A smaller switch than a conventional one was able to be realized.

Embodiment 2

This embodiment will describe a 32×32 multicast switch that uses four interposer 501 on one chip.

If the chip size increases as the number of integrated switches increases, consideration needs to be given to the influence of warping of the chip.

There are cases where an interposer whose lead pin portion is of the spring type is used in order to address warping of the chip, but if the amount of warping of the chip increases, it can be expected that the amount of warping cannot be addressed only with the spring of the lead pin of the interposer. Embodiment 2 will describe electrical mounting for addressing warping of the chip by using a plurality of interposers for one chip.

FIG. 5 shows a 32×32 multicast switch 500 in Embodiment 2. The constituent components are the same as those in Embodiment 1, whereas this embodiment addresses warping of the chip by using four interposers.

Although the number of optical switches accommodated is four times the number of switches in Embodiment 1, the electrical interconnect layout is basically the same as that of the switch in Embodiment 1. The PLC fixed to a fixing metal plate and control substrates for driving the PLC are connected to each other via the four interposers 501. As a result of measuring resistance values with an assembled module, all terminals were confirmed to be conductive, and the amount of variation in the resistance values was ±0.1Ω. Obtained values of the transmission loss and the extinction ratio were equal to those obtained when using the conventional (FIGS. 1 and 2) wire bonding. Accordingly, a 32×32 switch to which an electrical mounting method using the interposers 501 was applied was able to be realized.

The number of interposers to be mounted on the PLC is not limited to four, and any number of interposers may be mounted. The control substrate 505 for driving the PLC to be placed over the interposers may be divided into a plurality of control substrates, or may be a single control substrate.

Embodiment 3

Figure 6:
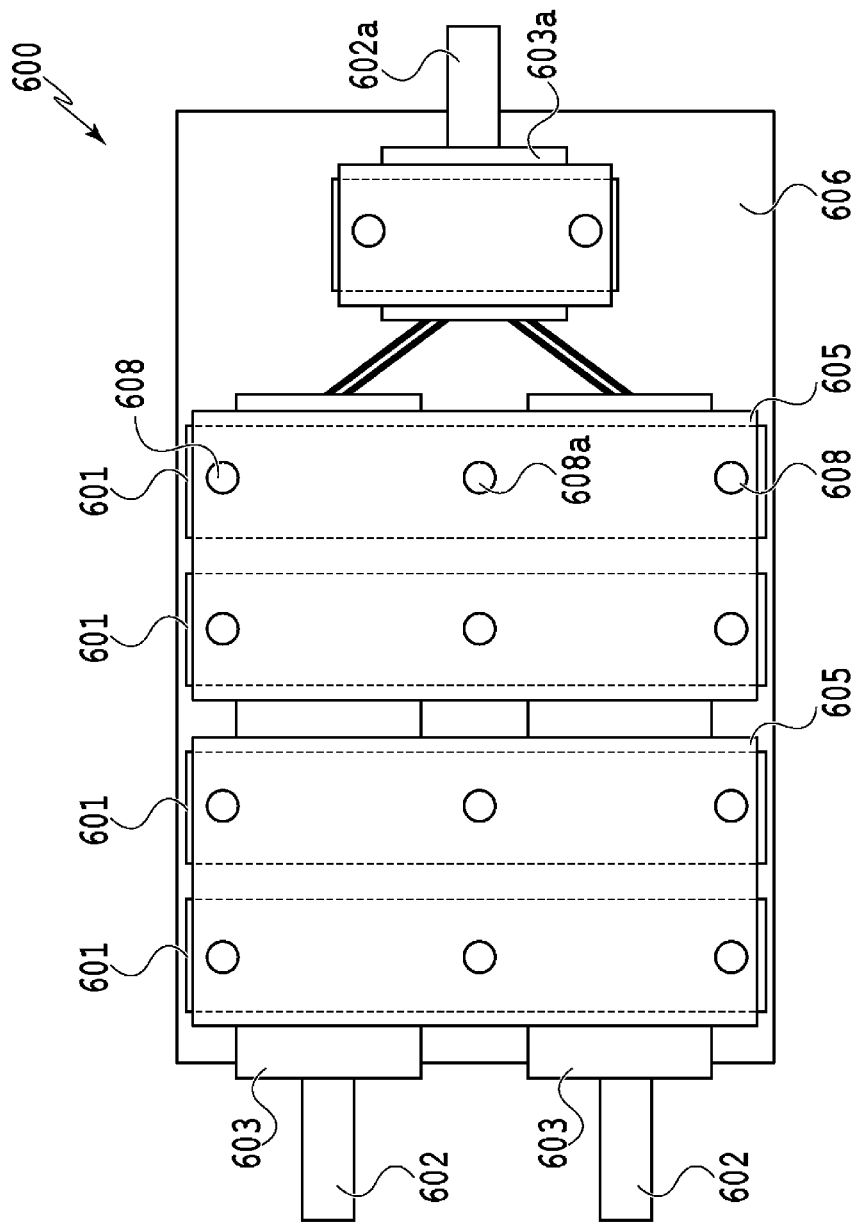
FIG. 6 is a top view showing a quartz PLC optical switch bare module that has an electrical mounting method of Embodiment 3.

Embodiment 3 will describe an optical switch module 600 shown in FIG. 6 in which electrodes of a plurality of PLC chips are connected to each other using interposers 601. Here, a multicast switch MCS will be described that is configured by combining a 16×16 multicast switch with three PLC switches, namely 1×2 switch 603a and 16×8 switches 603. Note that the two PLC switches 603 may be formed by dividing one PLC switch.

The 1×2 PLC switch 603a and the 16×8 PLC switches 603 are optically connected to each other via an optical waveguide, and the 1×2 PLC switch 603a and the 16×8 PLC switches 603 are connected to optical fibers 602a and 602, respectively. The 16×8 multicast switches 603 and the 1×2 switch 603a that use PLCs are fixed onto a fixing plate 606, which is a substrate for releasing heat. As shown in FIG. 6, control substrates 605, which are control boards, are placed over the plurality of PLCs 603 so as to cover the PLCs 603.

One or more interposers 601 that mediate the PLCs 603 and the control substrates 605 may be used as substrates.

The PLCs 603, the control substrates 605, and the interposers 601 are fixed using screws 608, similarly to Embodiment 1. At this time, by fixing, with the screws 608a, not only the two ends of each of the control substrates 605 but also an intermediate portion thereof sandwiched between the plurality of PLCs 603, lead pins of the interposers 601 are uniformly pressed against electrode pins of the control substrates 605 and the PLCs 603 over the entire face, and the electrical connection state between the electrode pads of the control substrates 605 and the lead pints of the interposers 601 can be made uniform over the entire face, and the electrical connection state between the electrode pads of the PLCs 603 and the lead pins of the interposers 601 can also be made uniform over the entire face.

This configuration in which divided chips are integrally connected by interposers is effective in the case of mounting uplink and downlink MCSs on one control board in a multicast switch for a ROADM system.

Figure 7:
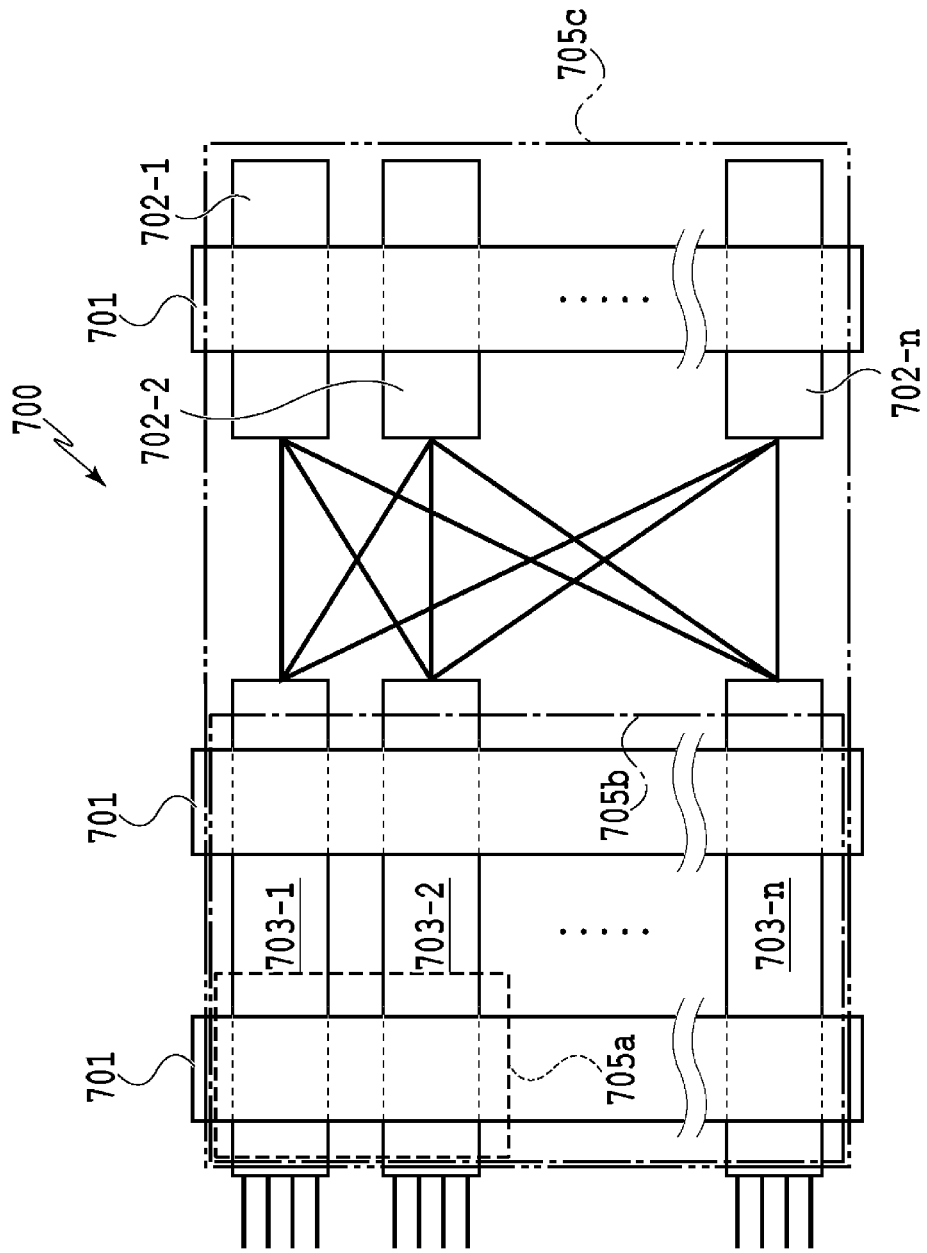
FIG. 7 is a diagram showing an example of a combination of PLC chips and interposers.

FIG. 6 discloses an optical switch module 600 in which one interposer 601 is laid over two PLCs 603 chips and connected thereto. Meanwhile, FIG. 7 discloses an optical switch module 700 in which n n×1 switches 702-1, 702-2, . . . 702-n (n is a natural number) and n Mn×N switches 703-1, 703-2, . . . 703-n (n is a natural number) are optically connected to each other via optical waveguides. The nx1 switches 702-1, 702-2, . . . 702-n and the Mn×N switches 703-1, 703-2, . . . 703-n are formed on a fixing plate (not shown), and interposers 701 are formed so as to be laid over the n×1 switches 702-1, 702-2, . . . 702-n. Also, a plurality of interposers 701 are formed so as to be laid over the Mn×N switches 703-1, 703-2, . . . 703-n. A control substrate is formed over the interposers 701.

The number of PLC chips over which the interposers 701 are laid may be any number, and the method for dividing the control substrate to cover these interposers 701 from above may also be any method. For example, as indicated by dotted lines in FIG. 7, a control substrate 705*a* may cover the Mn×N switches 703-1 and 703-2. Also, as indicated by dash-dot lines in FIG. 7, a control substrate 705*b* may cover the Mn×N switch 703-*n*. Further, as indicated by dash-double dot lines in FIG. 7, a control substrate 705*c* may cover the nx1 switches 702-1, 702-2, . . . 702-*n*.

The electrical mounting method in Embodiments 1 to 3 of the present invention can be applied to not only optical switches but also optical modules that need to be electrically driven. The type of planar lightwave circuit is not limited to a quartz PLC, and may alternatively be SiPh (silicon photonics) or the like. The present invention is effective since it can also reduce the chip size of a small-scale optical switch.

INDUSTRIAL APPLICABILITY

The present invention can be applied to optical modules that include a planar lightwave-type optical device for use in optical communication.

REFERENCE SIGNS LIST

300 Multicast switch module
301 Interposer
301*a* Lead pin (hinge electrode)
301*b* Lead pin (hinge electrode)
302 Optical fiber
303 Planar lightwave circuit (PLC)
304 Mach-Zehnder interferometer
305 Control substrate
306 Fixing plate
307 Electrode pad
308 Screw
309 Guide pin

The invention claimed is:

1. An optical module comprising:
   a planar lightwave circuit having an electrode pad on an upper face;
   a control substrate for driving the planar lightwave circuit, the control substrate being arranged above the upper face of the planar lightwave circuit and having an electric pad on a lower face opposing the upper face of the planar lightwave circuit;
   an electrical intermediary component arranged between the upper face of the planar lightwave circuit and the lower face of the control substrate;
   a first hinge electrode extending from the electrode pad on the upper face of the planar Lightwave circuit to a bottom surface of the electrical intermediary component; and
   a second hinge electrode extending from the electrode pad on the lower face of the control substrate to a top surface of the electrical intermediary component,
   wherein the electrode pad of the planar lightwave circuit and the electrode pad of the control substrate are connected to each other via the first and second hinge electrodes and the electrical intermediary component.

2. The optical module according to claim 1, wherein the planar lightwave circuit and the control substrate are electrically connected to each other using a plurality of the electrical intermediary components.

3. The optical module according to claim 1, wherein the number of at least one of the planar lightwave circuit, the electrical intermediary component, and the control substrate is more than one.

4. The optical module according to claim 1, wherein the electrical intermediary component is laid over a plurality of the planar lightwave circuits and is connected thereto.

5. The optical module according to claim 4, wherein the control substrate is laid over a plurality of the planar lightwave circuits, and a screw is arranged between the planar lightwave circuits.

6. The optical module according to claim 1, wherein the electrical intermediary component is an interposer.

* * * * *